United States Patent [19]

Puryear et al.

[11] Patent Number: 5,323,985
[45] Date of Patent: Jun. 28, 1994

[54] UNITIZED THRUST BEARING

[75] Inventors: John W. Puryear, Sapulpa Creek; David C. Wuellner, Tulsa, both of Okla.

[73] Assignee: Zebco Corporation, Tulsa, Okla.

[21] Appl. No.: 740,967

[22] Filed: Aug. 6, 1991

[51] Int. Cl.$^5$ ............................................. A01K 89/01
[52] U.S. Cl. .................................... 242/238; 242/321; 384/609; 384/615
[58] Field of Search ............... 242/321, 238, 239, 240; 384/126, 607, 609, 611, 615

[56] References Cited

U.S. PATENT DOCUMENTS

| | | | |
|---|---|---|---|
| 780,409 | 1/1905 | Conway et al. | 384/615 |
| 1,011,028 | 12/1911 | Chambers | 384/609 |
| 1,931,871 | 10/1933 | Large | 384/609 |
| 2,173,508 | 9/1939 | Horrocks | 384/615 |
| 3,268,279 | 8/1966 | Greby | 384/611 X |
| 3,836,092 | 9/1974 | Hull | 242/321 X |
| 4,324,443 | 4/1982 | Dagiel | 384/607 |
| 4,332,358 | 6/1982 | Neufeld | 242/321 |
| 4,699,530 | 10/1987 | Satoh et al. | 384/609 |
| 4,995,737 | 2/1991 | Moller et al. | 384/611 X |

Primary Examiner—Daniel P. Stodola
Assistant Examiner—Michael R. Mansen
Attorney, Agent, or Firm—Wood, Phillips, VanSanten, Hoffman & Ertel

[57] ABSTRACT

A unitized thrust bearing for reducing axial frictional forces resulting from axial loads on first and second abutting parts rotated relative to one another in a fishing reel. The thrust bearing has an annular outer race having a forward wall with a rearwardly facing surface and a forwardly facing surface and a bore for axially receiving the first abutting part. The outer race further includes a peripheral sidewall. The outer race is configured to be axially received in a seat in one of the first and second abutting parts. The thrust bearing further includes an annular inner race having a center shaft receiving bore, a rearwardly facing surface defining a support surface for the other of the one of the first and second abutting parts having the seat and a forwardly facing surface defining an axial ball contacting surface. The inner and outer races are axially received one within the other. The thrust bearing further includes a plurality of bearing balls disposed in a chamber defined by the rearwardly facing surface of the forward wall of the outer race, the side wall of the outer race and axial ball contacting surface of the inner race.

6 Claims, 2 Drawing Sheets

UNITIZED THRUST BEARING

BACKGROUND OF THE INVENTION

1. Technical Field

The present invention is directed toward fishing reels and more particularly toward a unitized thrust bearing for the center shaft of a fishing reel.

2. Background Art

In one type of closed-faced spin cast fishing reel, a reel frame or deck plate has an axial bore for receiving a center shaft. Formed integrally with the center shaft or splined thereon is a helical pinion gear. When the center shaft is disposed within the bore of the deck plate the pinion gear extends rearwardly from the deck plate. The drive system further includes a face drive gear cooperatively interengaging with the helical pinion gear. Attached to the drive gear is a crank/drive shaft which in turn is attached to a crank handle. When the crank handle is rotated in a line retrieving direction the drive gear is rotated, which in turn causes rotation of the helical pinion gear and the center shaft associated therewith. When the drive gear causes rotation of the pinion gear and associated center shaft, a radial load is transmitted to the center shaft. In addition, because of the helical angle of the pinion gear, the pinion gear is axially thrust forwardly towards the deck plate when the pinion gear is caused to rotate in a line retrieving direction. Other forces may add to the radial loading or axial thrust toward the deck plate.

Many reels seat a conventional ball bearing at the rearward portion of the deck plate to dissipate the frictional resistance to rotation of the center shaft caused by the forward thrust (or axial load) of the pinion gear and the radial load of the drive gear. However, such ball bearings are expensive, not readily available in small sizes required by fishing reels and hard to turn if grease used on the reel gears seeps into the ball area. Moreover, while these ball bearings are effective in alleviating radial frictional forces opposing rotation of the center shaft, they are not very effective against the axial frictional forces caused by forward thrust of the pinion gear when the center shaft is caused to turn in a line retrieving direction. In particular, conventional ball bearings do not hold up for long periods of time under repeated forward thrusts of the pinion gear.

As an alternative to standard ball bearings, some reels use an angular contact bearing. Angular contact bearings are designed to stand up to the axial forward thrust of the pinion gear. However, angular contact bearings are more expensive than conventional ball bearings and are inferior to conventional ball bearings for facilitating rotation of the center shaft under radial loads.

A third alternative is the use of a bushing such as an OILITE TM bushing in the bore in the deck plate. Under prolonged axial loads, such as when a fish is retrieved, binding often occurs between the bushing and the pinion gear in contact therewith. In addition, fishermen are known to associate smooth operation and high quality with reels having ball bearings and therefore prefer such reels over those using bushings.

A fourth alternative is the use of a thrust bearing consisting of a bearing plate having an inner diameter and an outer diameter, the inner diameter corresponding to the diameter of the center shaft. The bearing plate has a plurality of bearing ball containing holes radially spacing a plurality of bearing balls and retaining the bearing balls within the bearing plate. A top and a bottom thrust washer are disposed above and below the bearing plate in contact with the balls. The thrust washers have the same inner diameter and outer diameter as the bearing plate. Such thrust bearings are only capable of dissipating axial frictional forces. To dissipate frictional forces caused by radial loads, a bushing axially receiving the center shaft, such as an OILITE TM bushing, is disposed within the axial bore of the deck plate.

This thrust bearing structure has several serious problems. First, these thrust bearings require a large outside diameter of the bearing plate and thrust washers relative to a given shaft size. These large outer diameters are a significant problem because of the overriding objective to minimize the size and weight of fishing reels. In addition, the open construction of this thrust bearing leaves the bearing balls subject to contamination which inhibits their performance. Moreover, the bearing plate with balls and the thrust washers are relatively expensive. Finally, when such thrust bearings are being incorporated into a reel three material handling steps (one for each of the thrust washers and the bearing plate) are required to assemble the thrust bearing, resulting in added assembly costs. Finally, the centricity of the thrust bearing is typically at a higher tolerance than that of the bushing. In order to keep manufacturing cost reasonable, therefore, the bushing must be spaced from the thrust bearing in the axial bore in the deck plate to permit the center shaft to align with the inner diameter of the thrust bearing and the inner diameter of the bushing. As a result, the center shaft is subjected to a significant moment force by radial loads. This moment unduly stresses the fishing reel components and leads to a "loose" feel in the fishing reel.

SUMMARY OF THE INVENTION

The present invention is directed toward overcoming one or more of the problems set forth above.

The present invention is directed toward a thrust bearing for reducing frictional forces resulting from axial loads on a center shaft in a fishing reel. More particularly, the thrust bearing is intended for use in a fishing reel of the type having a deck plate with a center shaft bore and a center shaft disposed in the center shaft bore. The thrust bearing facilitates rotation of the center shaft relative to the deck plate when the center shaft is under an axial thrust directed toward the deck plate. The thrust bearing has an annular outer race or housing having a forward wall with a rearwardly facing surface and a forwardly facing surface and a center shaft receiving bore. The outer race further includes a peripheral sidewall. The outer race is configured to be axially received in a seat in a deck plate surrounding a center shaft bore in a deck plate. The thrust bearing further includes an annular inner race having a center shaft receiving bore, a rearwardly facing surface defining an axial center shaft support surface and a forwardly facing surface defining an axial ball contacting surface. The inner and outer races are received, one within the other. The thrust bearing further includes a plurality of bearing balls disposed in a cavity defined by the rearwardly facing surface of the bottom of the outer race, the side wall of the outer race and axial ball contacting surface of the inner race.

The thrust bearing can further include a structure for preventing axial separation of the inner race and the outer race while at the same time permitting axial rotation of the inner and outer races relative to one another.

Preferably, the structure for joining the inner and outer races includes a radially outwardly projecting annular flange on the inner race and a radially inwardly projecting annular retaining lip on the side wall of the outer race.

The thrust bearing may also include a separator ring for maintaining the balls in a radially spaced relationship in the ball containing cavity. An annular sealing lip extending radially inwardly from the forwardly facing surface of the outer race can also be included for sealing the ball containing chamber against intrusion by contaminants. The thrust bearing can further include an annular ball retaining lip on at least one of the rearwardly facing surface of the forward wall of the outer race and the forwardly facing surface of the inner race proximate their respective center shaft receiving cores. The inner and outer races can be formed of many materials including brass and plastic.

The thrust bearing can be modified to facilitate rotation of a center shaft under a radial load by configuring the ball containing cavity such that the balls project radially inwardly from the cavity, cooperatively defining a ring for axially receiving and guiding rotation of the center shaft.

The unitized thrust bearing of the present invention has a smaller outside diameter for a given shaft size than most existing thrust bearings. Thus, the unitized thrust bearing helps to reduce both the size and weight of the fishing reel within which it is employed. In addition, because the unitized thrust bearing is a single piece, it may be installed in a fishing reel in a more expeditious manner than the three pieces which must be installed to complete one known thrust bearing presently used in the art. Moreover, because the unitized thrust bearing of the present invention is sealed against contamination to a greater extent than the prior art thrust bearings, it is less likely to become fouled and ineffective in dissipating frictional forces. Finally, the unitized thrust bearing of the present invention provides a bearing structure significantly less expensive than prior art alternatives, thereby providing a ball bearing which is preferred by fisherman at a cost significantly less than prior art alternatives.

DESCRIPTIONS OF THE DRAWINGS

DETAILED DESCRIPTION OF THE PREFERRED EMBODIMENT

Figure 1:
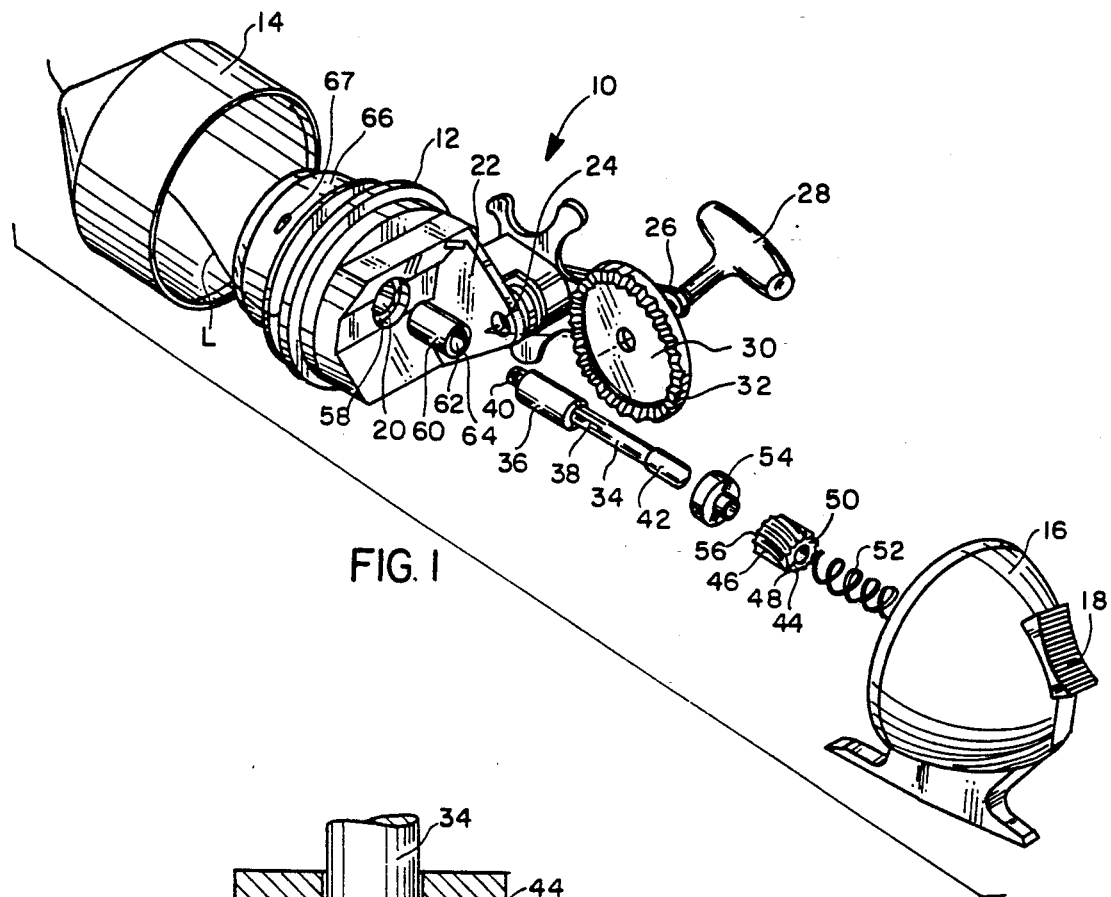
FIG. 1 is an exploded, perspective view of a closed-face/spin cast fishing reel including the unitized thrust bushing of the present invention.

A fishing reel 10, suitable for incorporation of the present invention, includes a cylindrical reel frame body or deck plate 12. The deck plate 12 is captively held between a threadably engaged cup-shaped front cover 14 and a cup-shaped back cover 16. The back cover 16 includes a pivotable thumb button 18. The deck plate 12 has a stepped, axial, cylindrical bore 20 extending therethrough. An integral boss 22 extends rearwardly from the deck plate 12. The boss 22 has a drive shaft bore 24 therethrough.

The reel 10 has a drive mechanism including a crank handle 26. A crank knob 28 is rotatably attached to one end of the crank handle 26. The other end of the crank handle 26 is attached to a crank/drive shaft (not shown) which extends through the drive shaft bore 24 of the boss 22 and axially engages a face drive gear 30. The drive gear 30 has axially projecting teeth 32.

The drive mechanism further includes a center shaft 34. The center shaft 34 is stepped and has an enlarged forward portion 36. The center shaft 34 further includes a keying portion 38. A threaded end 40 is adjacent to and forwardly of the enlarged portion 36 of the center shaft 34. An enlarged head 42 is formed at the other end of the shaft 34.

A pinion gear 44 has helical teeth 46 and an axial bore 48 having a complementary cross section for making keyed connection with the portion 38 of the center shaft 34 to prevent relative rotation therebetween. The pinion gear 44 and enlarged portion 38 of the center shaft 34 have, in one form, cooperating splines to effect the keyed connection. Or, alternatively, the pinion gear 44 may be integrally formed on the center shaft 34. When the center shaft 34 is seated in the axial bore 20 of the deck plate 12, the helical teeth 46 of the pinion gear 44 cooperatively interengage the axially projecting teeth 32 of the drive gear 30.

Between a rearwardly facing surface 50 of the pinion gear 44 and the enlarged head 42 of the center shaft 34 is mounted a spring 52. A unitized thrust bearing 54, according to the invention, is mounted to the drive shaft 34 between a forwardly facing surface 56 of the pinion gear 44 and the enlarged portion 36 of the center shaft 34. The unitized thrust bearing 54 is seated in an undercut portion 58 of the stepped axial cylindrical bore 20. An OILITE TM bushing 60 is seated within the cylindrical bore 20 and axially receives the enlarged portion 36 of the center shaft 34 in a cylindrical bore 62 therethrough. A rearwardly facing surface 64 of the bushing 60 abuts the thrust bearing 54.

A spinner head 66 threadably engages on the threaded end 40 of the center shaft 34. The spinner head 66 includes a retractable pickup pin 67 which holds line L on the spinner head 66 to cause the spinner head 66 to wrap line onto a spool (not shown) between the spinner head 66 and a rearwardly facing surface of the deck plate 12.

Figure 2:
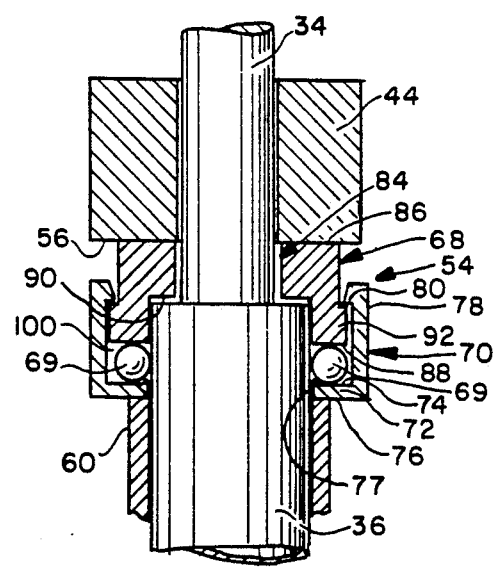
FIG. 2 is an enlarged sectional side view of the unitized thrust bushing of the present invention including the center shaft and pinion gear about which the unitized thrust bearing is mounted.
Figure 3:
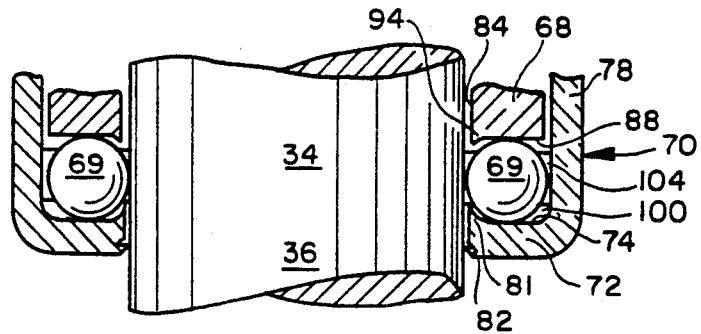
FIG. 3 is an enlarged sectional side view of the present invention illustrating a sealing ring thereon.

The thrust bearing 54 of the present invention is most clearly illustrated in FIGS. 2 and 3. The thrust bearing includes an annular inner race 68, a plurality of bearing balls 69 and a housing or annular outer race 70.

The annular outer race 70 has a forward wall 72 having a rearwardly facing surface 74, a forwardly facing surface 76 and a cylindrical center shaft receiving bore 77. The outer race 70 further includes a side wall 78 at the outer periphery of the wall 72. A radially inwardly projecting retaining lip 80 is at the rear of the side wall 78. An annular ball retaining flange 81 is included on the surface 74 of the forward wall of the outer race 70 proximate the center shaft receiving bore 77. The wall 72 of the outer race 70 also has an annular sealing lip 82 which abuts the enlarged portion 36 of center shaft 34.

The annular inner race 68 has a cylindrical center shaft receiving bore 84. The inner 68 race further includes a rearwardly facing pinion gear abutting surface 86 and a forwardly facing ball contacting surface 88. The inner race 68 also has a radially inwardly extending shoulder 90 for abutting the enlarged portion 36 of the center shaft 34. A radially outwardly projecting annular flange 92 is captively received by the inwardly facing annular lip 80 of the outer race 70. As best seen in FIG. 3, the inner race 68 also includes on the ball contacting surface 88 an annular ball retaining flange 94.

The ball contacting surface 88 of the inner race 68, the sidewall 78 of the outer race 70 and the rearwardly facing surface 74 of the forward wall 72 of the outer race 70 define a chamber 100 for captively holding the plurality of bearing balls 69. A separator ring 104 can be included to consistently position the bearing balls 69 within the bearing ball chamber 100.

Figure 7:
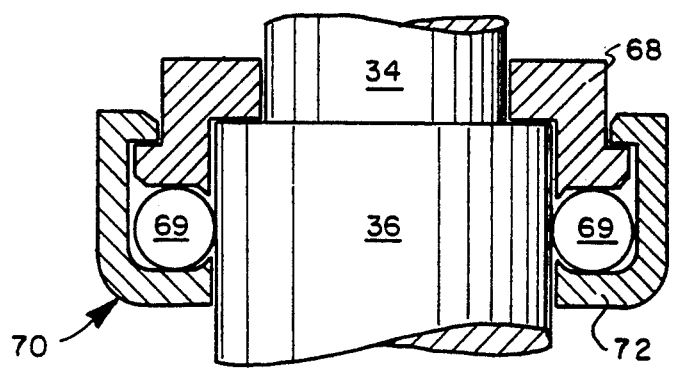
FIG. 7 is an enlarged side elevation view of an alternative embodiment of the present invention wherein the bearing balls define a center shaft support ring.

In an alternative embodiment of the present invention illustrated in FIG. 7, the forward wall 72 of the outer race 70 is shortened in a radial direction so that the balls 69 are caused to extend out of the ball chamber 100 and the separator ring is omitted. The balls 69 therefore define an inner ring for receiving the enlarged portion 36 of the outer shaft 34 and supporting it against radial loads.

Briefly, the operation of the fishing reel 10 can be described as follows. The center shaft 34 is biased rearwardly by the spring 52. Depression of the thumb bottom 18 by a user pushes the center shaft 34 forward relative to the deck plate 12. The spinner head 66 attached to the forward threaded end 40 of the center shaft 34 is thereby pushed forward against an inside rearwardly facing surface on the front cover 14. Line L is then trapped between the spinner head 66 and the front cover 14 to prevent the line L from being payed out from the line spool (not shown). Forward displacement of the spinner head 66 also causes the pickup pin 67, which normally projects radially through the spinner head 66, to be withdrawn to thereby allow the line L to freely uncoil from the spool. When the line L is to be cast forward, the user releases the thumb button 18, causing the spinner head 66 to move rearwardly relative to the front cover 14 by action of the spring 52, thereby allowing the line L to be payed out from the line spool. After the line L has been payed out, the user rotates the handle in a line retrieving direction which causes the pickup pin 67 on the spinner head 66 to project through the spinner head 66 to thereby pick up the line L.

Retrieval of the line L is affected by continuous rotating of the center shaft 34 by means of the crank handle 26. More particularly, rotating the crank handle 26 rotates the drive shaft (not shown) and in turn causes rotation of the drive gear 30. The axially projecting teeth 32 of the drive gear 30 cooperatively engage the helical teeth 46 of the pinion gear 44, causing the pinion gear 44 to rotate which causes rotation of the center shaft 34 which in turn rotates the spinner head 66. Rotating the spinner head 66 in the line retrieving direction causes the pickup pin 67 to feed the line L on to the line spool.

Figure 4:
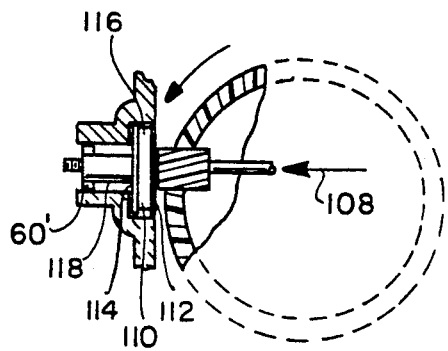
FIG. 4 is a side elevation view illustrating a prior art thrust bearing disposed between a reel deck plate and an helical pinion gear on a center shaft.
Figure 6:
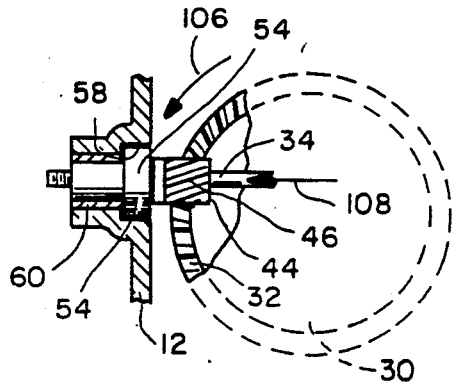
FIG. 6 is a side elevation view illustrating the unitized thrust bushing of the present invention disposed between a helical pinion gear on a center shaft and a reel deck plate.

As seen in FIGS. 4 and 6, during rotation of the drive gear 30 in a line retrieving direction 106, the helical angle of the helical teeth 46 of the pinion gear 44 causes a forward thrust of the pinion gear 44 in the direction of arrow 108 against the thrust bearing 54 (or the prior art thrust bearing 110 illustrated in FIG. 4).

The unitized thrust bearing 54 functions as follows. The outer housing 70 is seated in the stepped axial cylindrical bore 20 of the deck plate 12. More particularly, the outer race 70 is seated on the undercut portion 58 of the stepped cylindrical hole 20. (See FIG. 6) When the unitized thrust bearing 54 is subjected to an axial thrust in the direction of arrow 108, such as when the drive gear 30 is turned in the line retrieving direction 106, the pinion gear 44 contacts the pinion gear abutting surface 86 of the inner race 68. The forward thrust 108 is directly transmitted through the balls 69 and the forward wall 72 of the outer race 70 to the deck plate 12. However, because the ball contacting surface 88 of the inner race 82 rests on the plurality of bearing balls 102, the coefficient of friction when the pinion gear 44 and the center shaft 34 are rotated is minimal, thus facilitating smooth operation of the reel drive mechanism. The ball retaining annular flanges 94, 81 function to hold the plurality of bearing balls 69 in the ball receiving chamber 100 when the unitized thrust bearing 54 is not disposed upon a center shaft 34. As will be readily appreciated, the inwardly projecting annular lip 80 captively engages the radially outwardly projecting annular flange 92 to prevent axial separation of the inner and outer races 68, 70. However, there is sufficient play between the inwardly projecting annular lip 79 and the radially outwardly projecting annular flange 92 that rotation of the inner race 68 relative to the outer race 70 is uninhibited.

As is clearly seen in FIG. 2, the present invention contemplates considerable play between the inner and outer races 68, 70. Because of this play, the inner race 68 and outer race 70 may be readily axially aligned. Thus, the tolerances between the centricity of the center shaft receiving bore 77 of the outer race 70 and the centricity of the center shaft receiving bore 84 of the inner race 68 need not be precise, lowering manufacturing costs. Moreover, because of this play, as illustrated in FIG. 6, the bushing 60 may be flush against the forwardly facing surface 76 of the outer race 74. Thus, the bushing 60 can bear lateral loads such as when the drive gear 30 is turned in a line retrieving direction 106, thereby reducing the coefficient of friction between the center shaft 34 and the deck plate 12 and smoothing the operation of the fishing reel.

Figure 5:
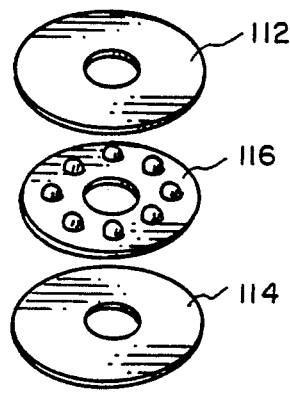
FIG. 5 is an exploded perspective view of a prior art thrust bearing.

In the prior art structure illustrated in FIGS. 4 and 5, the thrust washers 112, 114 and the ball bearing 116 are concentric with little radial play. Because the centricity of bushings such as the bushing 60 is typically not the same as the thrust bearing 112 and its components, misalignment often results. To alleviate misalignment problems, the prior art as illustrated in FIG. 4 maintains an axial gap 118 between the thrust bearing 112 and the bushing 60'. As a result, the center shaft 34 is cantilevered under a radial load such as when the drive gear 30 is turned in a line retrieval direction 106, causing a slight deflection of the center shaft 34 to try to produce a looser "feel" in the fishing reel.

In the alternative embodiment of the present invention illustrated in FIG. 7, the bearing balls 69 cooperatively define a shaft receiving ring. Thus, this embodiment provides both axial and radial support to the center shaft, obviating the need to use the bushing 60 shown in FIG. 6.

In the preferred embodiment of the present invention, the outer race 70 and the inner race 68 are made of brass and formed on a lathe or screw machine. Use of such precision machinery allows the outwardly projecting annular flange 92 of the inner race 68 to readily snap into the inwardly projecting annular lip 80 of the outer race 70. As illustrated in FIG. 2, the inwardly facing annular lip 80 may be inclined to be cammed radially outwardly during snap assembly. Thus, the unitized thrust bearing 54 as illustrated in FIG. 2 or FIG. 6 is assembled by placing the balls 69 in the portion of the ball receiving chamber 100 formed by the outer race 70 and then snapping the outwardly projecting annular flange 92 of the inner race 68 into the inwardly projecting annular lip 80 of the outer race 70.

The inner and outer races may also be formed of different materials machined in different ways. For example, the outer and inner races 70, 68 may be molded of plastics having lubricating and low wear characteristics such as nylon, VESPEL TM, DURACON TM, DELRIN TM. Or, the outer and inner races 70, 68 may be stamped from one of many metals. When the races are stamped they often must be crimped to axially hold the inner and outer races 68, 70 in an assembled position. In each embodiment, the bearing balls 102 are preferable made of stainless steel.

As will be readily appreciated, the unitized thrust bearing 54 of the present invention may also be used with a center shaft 34 not having an enlarged portion 36. When using such a center shaft, the radially inwardly extending shoulder 90 of the inner race 68 is unnecessary.

The unitized thrust bearing of the present invention provides numerous advantages over prior thrust bearings and structures to dissipate frictional forces caused by axial loads. Use of a ball bearing is preferable over the use of bushing such as an OILITE TM bushing for marketing purposes because fishermen are known to prefer fishing reels using ball bearings as opposed to bushings. The unitized thrust bearing of the present invention has a smaller outside diameter for a given shaft size than most prior art thrust bearings. Thus, the unitized thrust bearing contributes to minimizing the size and weight of the fishing reel within which it is employed. In addition, because the unitized thrust bearing illustrated in FIGS. 2, 3, 6 and 7 is a single piece, it may be installed in a fishing reel in a more expeditious manner than the three pieces which must be installed to complete the thrust bearing presently used in the art. Moreover, the sealed unitized thrust bearing is less likely to be damaged by grease from the gears or dust particles as are prior art thrust bearings.

I claim:

1. A thrust bearing for a fishing reel of the type having a deck plate with a center shaft bore and a center shaft disposed in the center shaft bore, the thrust bearing facilitating rotation of the center shaft relative to the deck plate when the center shaft is under an axial thrust directed toward the reel frame body, the thrust bearing comprising:

an annular outer race having a forward wall with a rearwardly facing surface and a forwardly facing surface and center shaft receiving bore, the outer face further having a peripheral side wall spaced radially outwardly of the center shaft receiving bore, the outer race being configured to be axially received in a seat in a deck plate;

an annular inner race having a center shaft receiving bore, a rearwardly facing surface defining a support surface and a forwardly facing surface defining an axial ball contacting surface, the inner race being axially received within the side wall of the outer race; and a plurality of bearing balls disposed in a cavity defined by the rearwardly facing surface of the forward wall of the outer race, the side wall of the outer race and the axial ball contacting surface of the inner race, the thrust bearing being configured such that the balls project radially inwardly from the cavity to define a ring for axially receiving a center shaft whereby rotation of a center shaft relative to a reel frame is facilitated when the center shaft is under an axial thrust and a radial load.

2. A thrust bearing for a fishing reel having a reel frame body with a center shaft bore and a drive system comprising a center shaft having a helical pinion gear disposed thereon, the center shaft being disposed within the cylindrical bore of the reel frame body such that the pinion gear extends from the reel frame body, the thrust bearing facilitating rotation of the center shaft relative to the reel frame when the center shaft is under an axial thrust directed toward the reel frame body, the thrust bearing comprising:

an annular outer race having a forward wall with a rearwardly facing surface and a forwardly facing surface and a cylindrical center shaft receiving bore, the outer race further having a side wall at the outer periphery of the rearwardly facing surface of the forward wall, the outer race being configured to be axially received in a seat in a reel frame body surrounding a center shaft receiving bore in a reel frame body;

an annular inner race having a center shaft receiving bore, a rearwardly facing surface defining a surface for supporting a pinion gear when a center shaft is under an axial thrust directed toward a reel frame body and a forwardly facing surface defining a ball contacting surface, the inner race being axially received within the side wall of the outer race;

a plurality of bearing balls disposed in a chamber defined by the rearwardly facing surface of the forward wall of the outer race, the side wall of the outer race and the ball contacting surface of the inner race; and joining means for preventing axial separation of the inner race and the outer race but permitting the inner and outer races to axially rotate relative to one another, the thrust bearing being configured such that the balls project radially inwardly from the cavity to define a ring for axially receiving a center shaft whereby rotation of a center shaft relative to a reel frame is facilitated when the center shaft is under an axial thrust and a radial load.

3. A thrust bearing for a fishing reel of the type having a deck plate with a bore therethrough and a center shaft extending through the deck plate bore, the thrust bearing comprising:

an annular inner race defining a first axis;
an annular outer race defining a second axis;
a plurality of bearing balls; and cooperating means on the inner and outer races for holding the inner and outer races together in an operative position in which the bearing balls are captively held between the inner and outer races, said inner and outer races cooperatively defining a through bore to accept a center shaft, wherein with the bearing balls in an operative position and the inner and outer races held together in an operative position, the bearing balls extend radially inwardly relative to the axis of the inner race further than any part of the inner race to cooperatively define a receptacle for a center shaft.

4. A thrust bearing for use in a fishing reel having first and second abutting parts rotated relative to one another, at least one of the first and second abutting parts being subject to an axial thrust toward the other, the thrust bearing comprising:

an annular outer race having a forward wall with a rearwardly facing surface and a forwardly facing surface and a bore for axially receiving a first abutting part, he outer race further having a peripheral side wall spaced radially outwardly of the bore, the peripheral side wall being configured to be axially received in a seat in one of the first abutting part and a second abutting part;

an annular inner race having a bore for receiving the first abutting part, a rearwardly facing surface defining a support surface for the other of the one of the first and second abutting parts having the seat and a forwardly facing surface defining an axial ball contacting surface, the inner race and outer race being axially received one within the other; and a plurality of bearing balls disposed in a cavity defined by the rearwardly facing surface of the forward wall of the outer race, the side wall of the outer race and the axial ball contacting surface of the inner race, the balls projecting radially inwardly from the cavity to define a ring for axially receiving the first abutting part.

5. A thrust bearing for a fishing reel of the type having a deck plate with a center shaft bore and a center shaft disposed in the center shaft bore, the center shaft having a radially outwardly extending shoulder where a center shaft is received into a center shaft bore in a reel frame, the thrust bearing facilitating rotation of a center shaft relative to the deck plate when a center shaft is under an axial thrust directed toward the reel frame body, the thrust bearing comprising:

an annular outer race having a forward wall with a rearwardly facing surface and a forwardly facing surface and center shaft receiving bore, the outer race being directly abuttable to a center shaft in the center shaft receiving bore, the outer race further having a peripheral side wall spaced radially outwardly of the center shaft receiving bore, the outer race being configured to be axially received in a seat in a deck plate;

an annular inner race having a center shaft receiving bore, the inner race being directly abuttable to a center shaft in the center shaft receiving bore, a rearwardly facing surface defining a support surface and a forwardly facing surface defining an axial ball contacting surface, the inner race being axially received within the side wall of the outer race, the inner race further having a radially inwardly extending shoulder proximate the axial center shaft support surface configured to cooperatively engage a shoulder of a center shaft; and a plurality of bearing balls disposed in a cavity defined by the rearwardly facing surface of the forward wall of the outer race, the side wall of the outer race and the axial ball contacting surface of the inner race.

6. A thrust bearing for a fishing reel having a reel frame body with a center shaft bore and a drive system comprising a center shaft having a radially outwardly extending shoulder where a center shaft is received into a center shaft bore in a reel frame, the center shaft further having a helical pinion gear disposed thereon, the center shaft being disposed within the cylindrical bore of the reel frame body such that the pinion gear extends from the reel frame body, the thrust bearing facilitating rotation of the center shaft relative to the reel frame when the center shaft is under an axial thrust directed toward the reel frame body, the thrust bearing comprising:

an annular outer race having a forward wall with a rearwardly facing surface and a forwardly facing surface and a cylindrical center shaft receiving bore, the outer race being directly abuttable to a center shaft in the center shaft receiving bore, the outer race further having a side wall at the outer periphery of the rearwardly facing surface of the forward wall, the outer race being configured to be axially received in a seat in a reel frame body surrounding a center shaft receiving bore in a reel frame body;

an annular inner race having a center shaft receiving bore, the inner race being directly abuttable to a center shaft in the center shaft receiving bore, a rearwardly facing surface defining a surface for supporting a pinion gear when a center shaft is under an axial thrust directed toward a reel frame body and a forwardly facing surface defining a ball contacting surface, the inner race being axially received within the side wall of the outer race, the inner race further having a radially inwardly extending shoulder proximate the center shaft support surface configured to cooperatively engage a shoulder of a center shaft;

a plurality of bearing balls disposed in a chamber defined by the rearwardly facing surface of the forward wall of the outer race, the side wall of the outer race and the ball contacting surface of the inner race; and joining means for preventing axial separation of the inner race and the outer race but permitting the inner and outer races to axially rotate relative to one another.

* * * * *